US012118912B2

(12) United States Patent
Jiang et al.

(10) Patent No.: US 12,118,912 B2
(45) Date of Patent: Oct. 15, 2024

(54) PIXEL STRUCTURE AND DISPLAY PANEL

(71) Applicant: HKC CORPORATION LIMITED, Shenzhen (CN)

(72) Inventors: Lei Jiang, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/222,488

(22) Filed: Jul. 17, 2023

(65) Prior Publication Data

US 2024/0194108 A1 Jun. 13, 2024

(30) Foreign Application Priority Data

Dec. 9, 2022 (CN) ......................... 202211577743.6

(51) Int. Cl.
*G09G 3/20* (2006.01)

(52) U.S. Cl.
CPC ... *G09G 3/2003* (2013.01); *G09G 2300/0452* (2013.01); *G09G 2320/0233* (2013.01)

(58) Field of Classification Search
CPC ......... G09G 3/2003; G09G 2300/0452; G09G 2320/0233
See application file for complete search history.

(56) References Cited

U.S. PATENT DOCUMENTS

2015/0379924 A1* 12/2015 Matsueda ............ H10K 59/352 345/77
2016/0063911 A1 3/2016 Wu et al.
2019/0035861 A1* 1/2019 Wang ..................... H10K 59/38
2019/0251895 A1* 8/2019 Zhang .................. H10K 59/352
2019/0252469 A1* 8/2019 Xiao .................... H10K 59/122
(Continued)

FOREIGN PATENT DOCUMENTS

CN 110518036 A 11/2019
CN 112436048 A 3/2021
CN 113871443 A 12/2021
(Continued)

OTHER PUBLICATIONS

Chinese First Office Action,Chinese Application No. 202211577743.6, mailed Mar. 21, 2022 (13 pages).
(Continued)

*Primary Examiner* — Ariel A Balaoing

(57) ABSTRACT

A pixel structure and a display panel are provided. The pixel structure includes a plurality of pixel units. Each pixel unit includes a first sub-pixel, a second sub-pixel and a third sub-pixel. The first sub-pixel and the second sub-pixel are located on the same side of the third sub-pixel along the first direction. Each of the first sub-pixel and the second sub-pixel is arranged opposite to the third sub-pixel, and the first sub-pixel is arranged opposite to the second sub-pixel along the second direction. The areas of the first sub-pixel, the second sub-pixel and the third sub-pixel increase sequentially. The third sub-pixel includes a body portion and an extension portion. The body portion extends in the second direction, the extension portion is connected to the body portion and extends in the first direction towards the first sub-pixel and is arranged opposite to the first sub-pixel.

20 Claims, 4 Drawing Sheets

(56) References Cited

U.S. PATENT DOCUMENTS

| | | | | |
|---|---|---|---|---|
| 2020/0006444 | A1* | 1/2020 | Li | H10K 59/352 |
| 2021/0408161 | A1* | 12/2021 | Sui | H10K 59/352 |

FOREIGN PATENT DOCUMENTS

| | | | |
|---|---|---|---|
| CN | 113964171 | A | 1/2022 |
| CN | 114068660 | A | 2/2022 |
| CN | 114361232 | A | 4/2022 |
| CN | 114373792 | A | 4/2022 |
| CN | 115274802 | A | 11/2022 |
| CN | 115666186 | A | 1/2023 |

OTHER PUBLICATIONS

Chinese Rejection decision,Application No. 202211577743. 6,mailed Jun. 27, 2023 (10 pages).

International Search Report,International Application No. PCT/CN2023/102474, mailed Aug. 4, 2023 (15 pages).

* cited by examiner

PIXEL STRUCTURE AND DISPLAY PANEL

CROSS REFERENCE TO RELATED APPLICATIONS

The present disclosure claims priority to Chinese Patent Application No. 202211577743.6, entitled "PIXEL STRUCTURE AND DISPLAY PANEL", filed on Dec. 9, 2022, the entire contents of which are incorporated herein by reference.

TECHNICAL FIELD

The present disclosure relates to the field of display technologies, and in particular to a pixel structure and a display panel.

BACKGROUND

Organic electroluminescent display apparatuses, especially organic light-emitting diode (OLED) display panels, are widely used in mobile phones, tablets, and computer display panels due to advantages of self-illumination, wide viewing angle, fast response, light-weight, thinness, and high contrast etc.

Nowadays, each OLED display panels includes a plurality of pixel units. Each pixel unit includes three sub-pixels of different colors. The luminous levels of the sub-pixels of different colors are controlled to display pictures of different colors. To ensure a more uniform color distribution of the pixel unit to guarantee the display quality of pictures, the standard RGB layout is commonly adapted. However, since the light-emitting materials of the sub-pixels of different colors are different, the life-spans of the sub-pixels of the three colors are also different. In addition, the perception degrees of different colors by the human eye varies, the standard sub-pixel layout will lead to picture color shift issues in the display panel at a later usage stage. In the related art, by reducing the area of sub-pixels whose luminous brightness decay more slowly, the gap in light-emitting life-spans between sub-pixels of different colors is reduced.

However, reducing the area of sub-pixels whose luminous brightness decays more slowly leads to the issue of lower utilization ratio of the pixel's aperture area.

SUMMARY

A pixel structure and a display panel are provided in the present disclosure.

In a first aspect, the present disclosure provides a pixel structure. The pixel structure includes a plurality of pixel units. Each of the plurality of pixel units includes a first sub-pixel, a second sub-pixel and a third sub-pixel. The first sub-pixel and the second sub-pixel are located on a same side of the third sub-pixel along a first direction. Each of the first sub-pixel and the second sub-pixel is arranged opposite to the third sub-pixel. The first sub-pixel and the second sub-pixel are arranged opposite to each other along the second direction. The first direction intersects with the second direction. Areas of the first sub-pixel, the second sub-pixel and the third sub-pixel increase sequentially. The third sub-pixel includes a body portion and an extension portion. The body portion extends in the second direction. The extension portion is connected to the body portion and extends in the first direction towards the first sub-pixel, and is arranged opposite to the first sub-pixel.

In a second aspect, the present disclosure provides a display panel. The display panel includes a display region and a non-display region located around the display region. The display region includes a pixel structure. The pixel structure includes a plurality of pixel units, each of the plurality of pixel units includes a first sub-pixel, a second sub-pixel and a third sub-pixel. The first sub-pixel and the second sub-pixel are located on a same side of the third sub-pixel along a first direction: each of the first sub-pixel and the second sub-pixel is arranged opposite to the third sub-pixel, and the first sub-pixel and the second sub-pixel are arranged opposite to each other along the second direction; the first direction intersects with the second direction. Areas of the first sub-pixel, the second sub-pixel, and the third sub-pixel increase sequentially. The third sub-pixel includes a body portion and an extension portion, the body portion extends in the second direction, the extension portion is connected to the body portion and extends in the first direction towards the first sub-pixel, and the extension portion is arranged opposite to the first sub-pixel.

BRIEF DESCRIPTION OF THE DRAWINGS

In order to more clearly illustrate technical solutions in the present disclosure, the drawings required in the description of the embodiments will be briefly introduced below. Obviously, the drawings in the following description are only some embodiments of the present disclosure. For those of ordinary skills in the art, other drawings could be obtained based on these drawings without creative efforts.

REFERENCE NUMBERS

Figure 1:
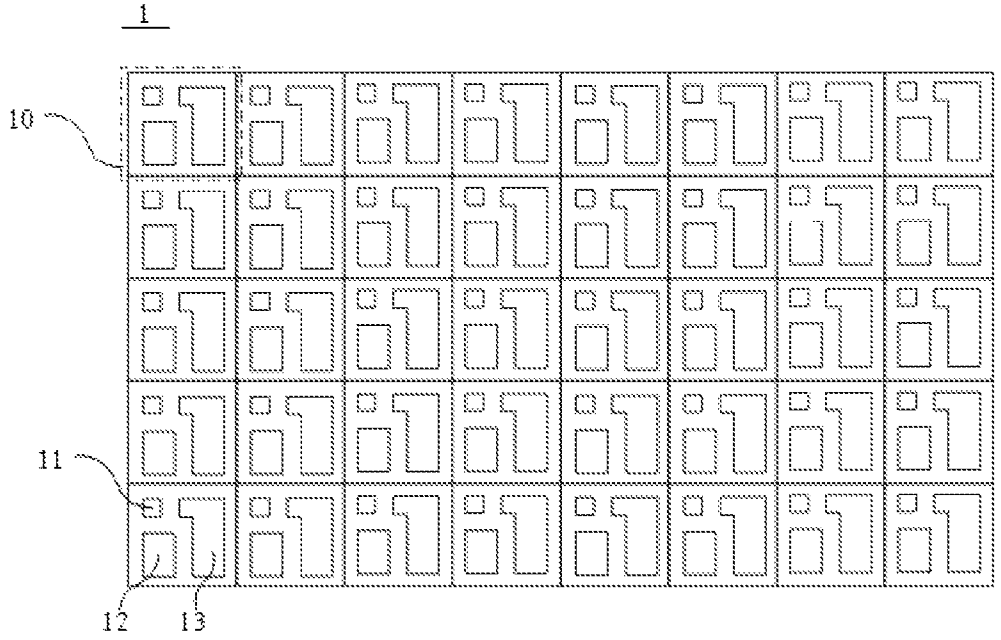
FIG. 1 is a structural diagram of a planar structure of a pixel structure according to an embodiment of the present disclosure.

1—pixel structure; 10—pixel unit; 11—first sub-pixel; 12—second sub-pixel; 121—rectangular portion; 122—compensation portion; 13—third sub-pixel; 131—body portion; 1311—first side edge; 1312—second side edge; 132—extension portion; 1321—third side edge; 1322—fourth side edge; 1323—arc-shaped edge; 100—display panel; 101—display region; 102—non-display region.

DETAILED DESCRIPTION

Technical solutions in embodiments of the present disclosure will be described clearly and thoroughly in connection with accompanying drawing of the embodiments of the present disclosure. Obviously, the described embodiments are only a part of the embodiments, but not all of them. All other embodiments by a person of ordinary skills in the art based on embodiments of the present disclosure without creative efforts shall all be within the protection scope of the present disclosure.

The terms 'first', 'second', and 'third' in this disclosure are only for the purpose of description, and cannot be construed as indicating or implying relative importance or implicitly indicating the number of technical features referred to. Therefore, the features defined with 'first', 'second', and 'third' may explicitly or implicitly include at least one of the features. In the description of the present disclosure, 'a plurality of' means at least two, such as two, three, etc., unless otherwise specifically defined. All directional indicators (such as up, down, left, right, front, back . . . ) in embodiments of the present disclosure are only used to explain a motion state, a relative positional relationship between the components in a specific posture (as shown in the drawings). If the specific posture changes, then the directional indication will change accordingly. In addition, the terms 'include', 'comprise' and any variations thereof are intended to cover non-exclusive inclusion. For example, a process, a method, a system, a product, or a device that includes a series of operations or units is not limited to the listed operations or units, but optionally includes unlisted operations or units, or optionally also includes other operations or units inherent to these processes, methods, products or devices.

Reference to 'embodiments' herein means that a specific feature, structure, or characteristic described in conjunction with the embodiments may be included in at least one embodiment of the present disclosure. The appearance of this phrase in various locations in the specification does not necessarily refer to the same embodiment, nor is it an independent or alternative embodiment mutually exclusive with other embodiments. Those skilled in the art may explicitly and implicitly understand that, the embodiments described herein may be combined with other embodiments.

The present disclosure will be described in detail below with reference to the drawings and embodiments.

As shown in FIG. 1, FIG. 1 is a structural diagram of a planar structure of a pixel structure according to one embodiment of the present disclosure. In some embodiments, a pixel structure 1 is provided. The pixel structure 1 may be applied to a display panel 100, in particular an OLED display panel 100. The pixel structure 1 includes a plurality of pixel units 10. The plurality of pixel units 10 may be provided according to a preset arranging manner or layout manner. The plurality of pixel units 10 are configured for displaying pictures or images. Specifically, the plurality of pixel units 10 are provided in a plurality of rows and a plurality of columns. The whole shape and size of the pixel unit 10 may be set according to the shape and size of the display region 101 of the display panel 100. The shape of each pixel unit 10 may be a rectangle, a triangle, a quadrangle, a polygon or other irregular shapes, which can be set according to the actual needs, without any specific limitation. In some embodiments, the plurality of pixel units 10 are provided in a plurality of rows and a plurality of columns. The plurality of pixel units 10 are as a whole arranged in a rectangular shape, each pixel unit 10 is a rectangle, and an aperture shape of each pixel unit 10 is also a rectangle. The specific structure and function of the pixel structure 1 are described in detail in the following embodiments.

Figure 2:
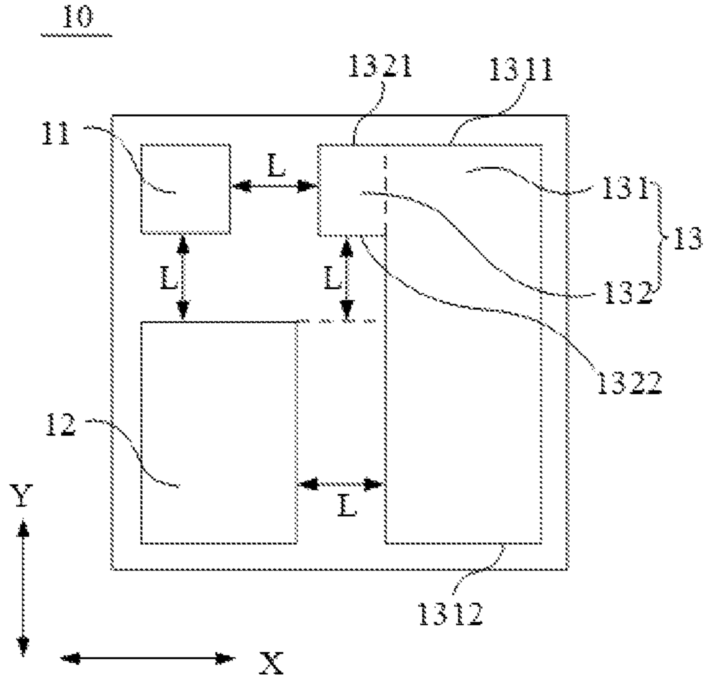
FIG. 2 is a schematic structural diagram of a pixel unit according to a first embodiment of the present disclosure.

As shown in FIG. 2, FIG. 2 is a schematic structural diagram of a pixel unit according to the first embodiment of the present disclosure. In some embodiments, the pixel unit 10 is provided. The pixel unit 10 includes a first sub-pixel 11, a second sub-pixel 12 and a third sub-pixel 13 for emitting light of three different colors, respectively. By controlling the luminous brightness of the first sub-pixel 11, the second sub-pixel 12 and the third sub-pixel 13 in each pixel unit 10, the light of different luminous brightness is superimposed and mixed to display different colored images. Specifically, the first sub-pixel 11 is a red-color sub-pixel, and is configured to emit the red light; the second sub-pixel 12 is a green-color sub-pixel, and is configured to emit the green light; and the third sub-pixel 13 is a blue-color sub-pixel, and is configured to emit the blue light. In other words, the first sub-pixel 11, the second sub-pixel 12 and the third sub-pixel 13 are configured to emit three primary colors of light, thus achieving a full-color display of the image.

In embodiments of the present disclosure, a first direction X and a second direction Y are defined to be interestingly arranged, and the first direction X and the second direction Y may be intersected at any preset angle. In the present and the following embodiments, the first direction X and the second direction Y are illustrated as mutually perpendicular. Along the first direction X, the first sub-pixel 11 and the second sub-pixel 12 are located on the same side of the third sub-pixel 13, each of the first sub-pixel 11 and the second sub-pixel 12 is arranged opposite to the third sub-pixel 13, and the first sub-pixel 11 is arranged opposite to the second sub-pixel 12 along the second direction Y. Each of the first sub-pixel 11 and the second sub-pixel 12 are arranged opposite to the third sub-pixel 13, indicating that the first sub-pixel 11 faces a portion of the third sub-pixel 13 in the first direction X, and the second sub-pixel 12 faces another portion of the third sub-pixel 13 in the first direction X. The first sub-pixel 11 is arranged opposite to the second sub-pixel 12 along the second direction Y, indicating that the first sub-pixel 11 faces the second sub-pixel 12 in the second direction Y. In other words, the first sub-pixel 11 and the second sub-pixel 12 are provided in a column in the second direction Y, and the third sub-pixel 13 is provided in a separate column. Each of the first sub-pixel 11 and the second sub-pixel 12 faces the third sub-pixel 13 in the first direction X respectively.

The areas of the first sub-pixel 11, the second sub-pixel 12, and the third sub-pixel 13 increase sequentially. Since the decay rate of the luminance of the light-emitting materials of the first sub-pixel 11, the second sub-pixel 12 and the third sub-pixel 13 increases in sequence, by adjusting the areas of the first sub-pixel 11, the second sub-pixel 12 and the third sub-pixel 13, the area of the red sub-pixel<the area of the green sub-pixel<the area of the blue sub-pixel, such that the luminance life-spans of the first sub-pixel 11, the second sub-pixel 12 and the third sub-pixel 13 would tend to be the same. In this way, during the later usage period of the display panel 100, the possibility of a phenomenon in which the displayed image becomes reddish due to the rapid decay of the luminous brightness of the third sub-pixel 13 is effectively reduced.

Specifically, the third sub-pixel 13 includes a body portion 131 and an extension portion 132. The body portion 131 extends along the second direction Y. The extension portion 132 is connected to the body portion 131, extends toward the first sub-pixel 11 along the first direction X and is arranged opposite to the first sub-pixel 11. In other words, the extension portion 132 is located on the side of the body portion 131 proximate to the first sub-pixel 11 and faces directly to the first sub-pixel 11 in the first direction X, such that the extension portion 132 is arranged in the vacant region between the first sub-pixel 11 with the smallest area and the body portion 131. In this way, not only the area of the third sub-pixel 13 is increased to extend the luminous life-span of the third sub-pixel 13, but also the first sub-pixel 11, the second sub-pixel 12 and the third sub-pixel 13 are provided more compactly in the limited space of the pixel unit 10, and the aperture area of the pixel unit 10 can be exploited sufficiently, thereby effectively improving the utilization ratio of the aperture area of the pixel unit 10 of this pixel structure 1 and enhancing the luminous brightness of this pixel structure 1.

As shown in FIG. 2, the body portion 131 includes a first side edge 1311 and a second side edge 1312 arranged opposite to each other along the second direction Y, and the extension portion 132 includes a third side edge 1321 and a fourth side edge 1322 arranged opposite to each other along the second direction Y. Specifically, a side edge of the first sub-pixel 11 away from the second sub-pixel 12, the third side edge 1321, and the first side edge 1311 are flush in the first direction X. In other words, the side edge of the first sub-pixel 11 away from the second sub-pixel 12, the third side edge 1321 and the first side edge 1311 lie in a same line, and the line extends along the first direction X. A side edge of the first sub-pixel 11 away from the third sub-pixel 13 is flush with a side edge of the second sub-pixel 12 away from the third sub-pixel 13 in the second direction Y. In other words, the side edge of the first sub-pixel 11 away from the third sub-pixel 13 lies in the same line as the side edge of the second sub-pixel 12 away from the third sub-pixel 13, and the line extends along the second direction Y. A side edge of the second sub-pixel 12 away from the first sub-pixel 11 is flush with the second side edge 1312 in the first direction X. In other words, the side edge of the second sub-pixel 12 away from the first sub-pixel 11 lies in the same line as the second side edge 1312 of the third sub-pixel 13, and the line extends along the first direction X. It is easily seen that, with the above-mentioned arrangement, the outer side edges of the first sub-pixel 11, the second sub-pixel 12 and the third sub-pixel 13 are provided along the outer edge of the pixel unit 10 in which they are located, such that the whole shape of the first sub-pixel 11, the second sub-pixel 12 and the third sub-pixel 13 matches with the shape of the pixel unit 10, enabling a full utilization of the space within the pixel unit 10, reducing space waste, enhancing the light-emitting area of the pixel unit 10 and improving the area utilization ratio of the pixel unit 10.

Further, a spacing between the first sub-pixel 11 and the extension portion 132, a spacing between the first sub-pixel 11 and the second sub-pixel 12, and a spacing between the second sub-pixel 12 and the body portion 131 are all equal and identical to a preset distance L. The distance between any point on a side edge of the second sub-pixel 12 proximate to the first sub-pixel 11 and any point on the fourth side edge 1322 is greater than or equal to the preset distance L. Specifically, in order to avoid the issue of staggering and overlapping of the film layers of the first sub-pixel 11, the second sub-pixel 12 and the third sub-pixel 13 due to the shadows caused by the respective mask plates of the sub-pixels during processes such as vapor deposition or lithography, a certain spacing needs to be kept between each sub-pixel. The spacing is a preset distance L. The preset distance L ranges from 10 μm to 40 μm. For example, the preset distance L is set to 11 μm, 13 μm, 15 μm, 16 μm, 18 μm, 20 μm, 22 μm, 25 μm, 27 μm, 30 μm, 32 μm, 35 μm, 37 μm or 39 μm, depending on the actual requirements and manufacturing-procedure limitations, etc. Specifically, the spacing between the first sub-pixel 11 and the extension portion 132, the spacing between the first sub-pixel 11 and the second sub-pixel 12, and the spacing between the second sub-pixel 12 and the body portion 131 are all set to an equal preset distance L. At the same time, the distance between any point on the side edge of the second sub-pixel 12 proximate to the first sub-pixel 11 and any point on the fourth side edge 1322 is greater than or equal to the preset distance L. In this way, with the spacing among the various sub-pixels in the pixel unit 10 satisfying the requirements of the preset distance L, it is possible to maximize the area utilization of the pixel unit 10 and effectively improve the display brightness. The area or aperture area of the pixel unit 10 referred to in embodiments of the present disclosure indicates the area of the internal space enclosed by the periphery of the pixel unit 10.

In addition, the first sub-pixel 11, the second sub-pixel 12, the body portion 131, and the extension portion 132 are of rectangular shape. The distance between the fourth side edge 1322 and the side edge of the second sub-pixel 12 proximate to the first sub-pixel 11 in the second direction Y is equal to the preset distance L. Specifically, provided that the side edge of the second sub-pixel 12 away from the first sub-pixel 11 is flush with the second side edge 1312 of the body portion 131 along the first direction X, and that the second sub-pixel 12 is a rectangle, it is known that the side edge of the second sub-pixel 12 proximate to the first sub-pixel 11 also extends along the first direction X. Provided that the third side edge 1321 of the extension portion 132 is flush with the first side edge 1311 of the body portion 131 along the first direction X, and that the extension portion 132 is a rectangle, it is known that the fourth side edge 1322 also extends along the first direction X. Then the fourth side edge 1322 and the side edge of the second sub-pixel 12 proximate to the first sub-pixel 11 are parallel to each other, and the distance between the fourth side edge 1322 and the side edge of the second sub-pixel 12 proximate to the first sub-pixel 11 in the second direction Y is equal to a perpendicular distance between the two of them. This ensures that the spacing between the second sub-pixel 12 and the extension portion 132 is greater than or equal to the preset distance L, such that the distance between the arrangement location of the extension portion 132 and each of the first sub-pixel 11 and the second sub-pixel 12 may both reach a minimum value given the process constraints. In other words, the spacing between the extension portion 132 and the first sub-pixel 11 and the spacing between the extension portion 132 and the second sub-pixel 12 are reduced, thereby effectively increasing the utilization ratio of the area of the pixel unit 10, increasing the light-emitting area of the pixel unit 10, and thereby effectively increasing the display brightness. The area utilization ratio of the pixel unit 10 in the present embodiment is 41.66% through the calculation and analysis of experimental data. The currently common layout scheme of sub-pixels of the pixel unit 10 has a maximum area utilization ratio of 39%. The present embodiment may effectively improve the area utilization ratio of the pixel unit 10 compared to the common sub-pixel layout scheme.

Figure 3:
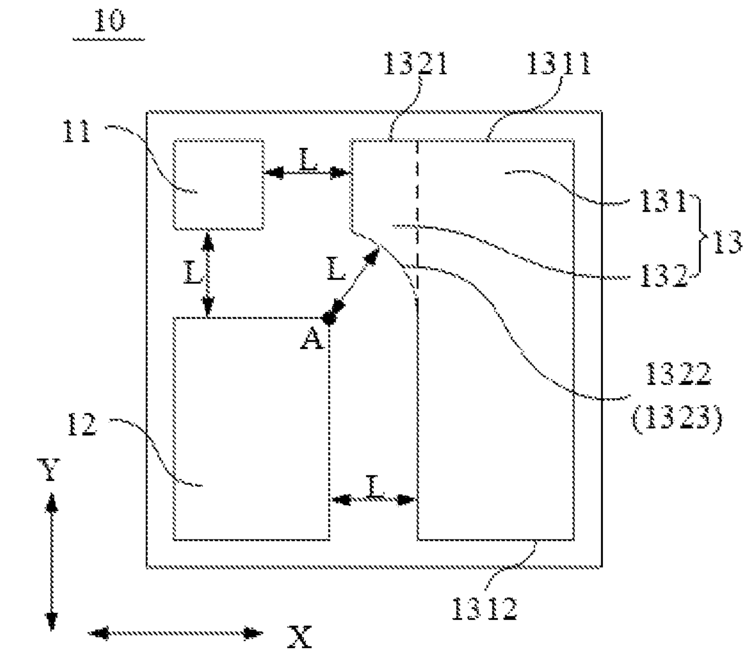
FIG. 3 is a schematic structural diagram of a pixel unit according to a second embodiment of the present disclosure.

As shown in FIG. 3, FIG. 3 is a schematic structural diagram of a pixel unit according to the second embodiment of the present disclosure. In the present embodiment, the first sub-pixel 11, the second sub-pixel 12 and the body portion 131 are all rectangles. The fourth side edge 1322 of the extension portion 132 includes an arc-shaped edge 1323, the arc-shaped edge 1323 is connected to a side edge of the body portion 131 proximate to the second sub-pixel 12, and a distance between a vertex A of the second sub-pixel 12 proximate to the extension portion 132 and any point on the arc-shaped edge 1323 is equal to the preset distance L. In other words, when the projection of the extension portion 132 on the second direction Y and the projection of the second sub-pixel 12 on the second direction Y have overlapped portions, the portion of the fourth side edge 1322 of the extension portion 132 proximate to the body portion 131 (corresponding to the portion whose projection do not overlap with the projection of the second sub-pixel 12) is the arc-shaped edge 1323, and the remaining portion of the fourth side edge 1322 (corresponding to the portion whose projection overlaps with the projection of the second sub-pixel 12) is a straight line, and the distance between the straight line and the side edge of the second sub-pixel 12 proximate to the first sub-pixel 11 in the second direction Y is equal to the preset distance L. The distance between any point on the arc-shaped edge 1323 and the vertex A of the second sub-pixel 12 proximate to the extension portion 132 is equal to the preset distance L, thereby further enlarging the area of the extension portion 132 and ensuring that the spacing between the second sub-pixel 12 and the extension portion 132 is within the range of the preset distance L, further increasing the area utilization ratio of the pixel unit 10 and increasing the light-emitting area of the pixel unit 10. Alternatively, when the projection of the extension portion 132 on the second direction Y and the projection of the second sub-pixel 12 on the second direction Y have no overlapped portion, the fourth side edge 1322 of the extension portion 132 as a whole is an arc-shaped edge 1323, and the distance between the vertex A of the second sub-pixel 12 proximate to the extension portion 132 and any point on the arc-shaped edge 1323 is equal to the preset distance L. In this way, the region between the fourth side edge 1322 and the side edge of the body portion 131 proximate to the second sub-pixel 12 is effectively utilized, the area of the extension portion 132 is further enlarged, and the spacing between the second sub-pixel 12 and the extension portion 132 is ensured to be within the range of the preset distance L. The area utilization ratio of the pixel unit 10 is further increased, and the light-emitting area of the pixel unit 10 is enlarged.

Figure 4:
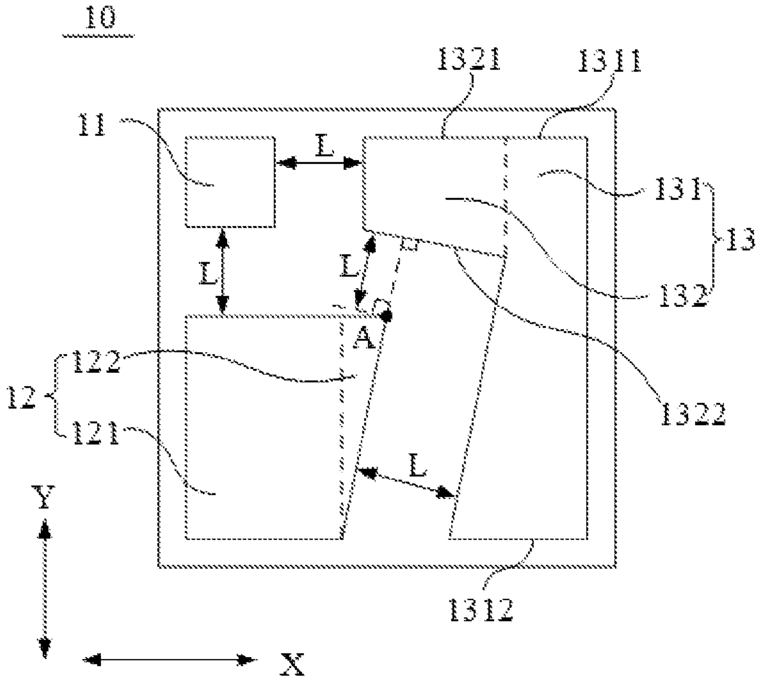
FIG. 4 is a schematic structural diagram of a pixel unit according to a third embodiment of the present disclosure.

As shown in FIG. 4, FIG. 4 is a schematic structural diagram of a pixel unit according to the third embodiment of the present disclosure. In the present embodiment, the first sub-pixel 11 is a rectangle, the angle between a side edge of the second sub-pixel 12 proximate to the body portion 131 and a side edge of the second sub-pixel 12 proximate to the first sub-pixel 11 is an acute angle or an obtuse angle. A side edge of the body portion 131 proximate to the second sub-pixel 12 and a side edge of the second sub-pixel 12 proximate to the body portion 131 are parallel to each other, and the perpendicular distance between the side edge of the body portion 131 proximate to the second sub-pixel 12 and the side edge of the second sub-pixel 12 proximate to the body portion 131 is equal to the preset distance L.

Specifically, the angle between the side edge of the second sub-pixel 12 proximate to the body portion 131 and the side edge of the second sub-pixel 12 proximate to the first sub-pixel 11 is an acute angle. In other words, the second sub-pixel 12 is an inverted right-angle trapezoid, and the waist of the right-angle trapezoid that is an oblique line is provided on the side proximate to the body portion 131, while the side edge of the body portion 131 proximate to the second sub-pixel 12 and the side edge of the second sub-pixel 12 proximate to the body portion 131 are parallel to each other, and the perpendicular distance between the side edge of the body portion 131 proximate to the second sub-pixel 12 and the side edge of the second sub-pixel 12 proximate to the body portion 131 is equal to the preset distance L. That is, the spacing between the body portion 131 and the second sub-pixel 12 is equal to the preset distance L. Specifically, in the present embodiment, the second sub-pixel 12 may include a rectangular portion 121 and a compensation portion 122. The compensation portion 122 is provided on a side of the rectangular portion 121 proximate to the body portion 131 and is connected to the rectangular portion 121. In comparison with the first embodiment and the second embodiment, in the present embodiment, by setting the second sub-pixel 12 as a right-angle trapezoid, the area of the second sub-pixel 12 increases by the area of the compensation portion 122, and the area of the third sub-pixel 13 decreases by a portion correspondingly, such that the difference between the area of the second sub-pixel 12 and the area of the third sub-pixel 13 would not be too great. That is, it is prevented that the area of the third sub-pixel 13 is too great due to the addition of the extension portion 132. A too great area of the third sub-pixel would make that the luminous life-span of the third sub-pixel 13 is not balanced in cooperation with that of the second sub-pixel 12 and the first sub-pixel 11. By reformulating and optimizing the shape and layout of the second sub-pixel 12 and the third sub-pixel 13 in the present embodiment, in the limited space of the pixel unit 10, the area allocation of the first sub-pixel 11, the second sub-pixel 12 and the third sub-pixel 13 is rendered more rational, which not only improves the area utilization ratio of the pixel unit 10, but also can further balance the luminous life-span of the first sub-pixel 11, the second sub-pixel 12 and the third sub-pixel 13, thus effectively avoiding the phenomenon of reddishly displayed image due to the rapid decay of the luminous brightness of the third sub-pixel 13 in the later usage period of the display panel 100.

Figure 5:
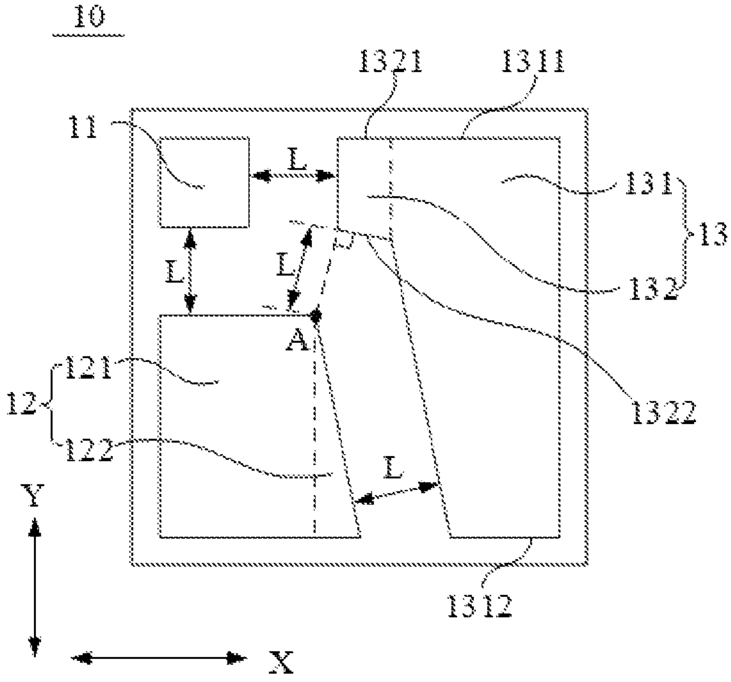
FIG. 5 is a schematic structural diagram of a pixel unit according to a fourth embodiment of the present disclosure.

As shown in FIG. 5, FIG. 5 is a schematic structural diagram of a pixel unit according to the fourth embodiment of the present disclosure. Unlike the third embodiment, in the present embodiment, the angle between the side edge of the second sub-pixel 12 proximate to the body portion 131 and the side edge of the second sub-pixel 12 proximate to the first sub-pixel 11 is an obtuse angle. In other words, the second sub-pixel 12 is an upright right-angle trapezoid, and the waist of the right-angle trapezoid that is an oblique line is provided on the side proximate to the body portion 131, while the side edge of the body portion 131 proximate to the second sub-pixel 12 and the side edge of the second sub-pixel 12 proximate to the body portion 131 are parallel to each other, and the perpendicular distance between the side edge of the body portion 131 proximate to the second sub-pixel 12 and the side edge of the second sub-pixel 12 proximate to the body portion 131 is equal to the preset distance L. That is, the spacing between the body portion 131 and the second sub-pixel 12 is equal to the preset distance L. Specifically, in the present embodiment, the second sub-pixel 12 may also include the rectangular portion 121 and the compensation portion 122. The compensation portion 122 is provided on the side of the rectangular portion 121 proximate to the body portion 131 and is connected to the rectangular portion 121. In comparison with the third embodiment, a length of a gap between the two of the first sub-pixel 11 and the extension portion 132 with the second sub-pixel 12 extending along the first direction X in the present embodiment is less than a length of a gap between the two of the first sub-pixel 11 and the extension portion 132 with the second sub-pixel 12 extending along the first direction X in the third embodiment. That is, a total area of the vacant area in the display unit of the present embodiment is less, thus enabling further increase in the area utilization ratio of the pixel unit 10, the light emitting area of the pixel unit 10 is greater, and the brightness is greater when the image is displayed.

In the present embodiment, the fourth side edge 1322 may be a straight line extending in the second direction Y, or a beveled edge with a certain slope, but it is necessary to guarantee that the perpendicular distance between the vertex A of the second sub-pixel 12 proximate to the extension portion 132 and the fourth side edge 1322 is equal to the preset distance L, such that the spacing between the second sub-pixel 12 and the extension portion 132 is equal to or greater than the preset distance L everywhere, thereby satisfying the distance requirement of the manufacturing procedure and avoiding overlapping of the film layer of the second sub-pixel 12 and the film layer of the extension portion 132, which affects the display of the pictures.

In the present embodiment, the area utilization ratio of the pixel unit 10 in the present embodiment is 41.82% through the calculation and analysis of experimental data. In comparison with the first embodiment, the area utilization ratio of the pixel unit 10 in the present embodiment is further increased.

Figure 6:
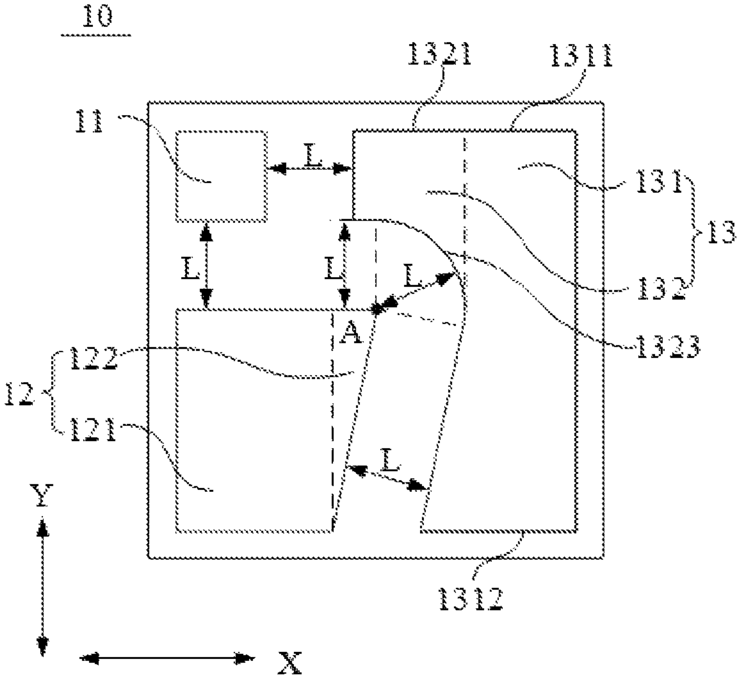
FIG. 6 is a schematic structural diagram of a pixel unit according to a fifth embodiment of the present disclosure.

As shown in FIG. 6, FIG. 6 is a schematic structural diagram of a pixel unit according to the fifth embodiment of the present disclosure. Unlike the third embodiment, in the present embodiment, the fourth side edge 1322 of the extension portion 132 includes an arc-shaped edge 1323, the arc-shaped edge 1323 is connected to the side edge of the body portion 131 proximate to the second sub-pixel 12, and a distance between a vertex A of the second sub-pixel 12 proximate to the extension portion 132 and any point on the arc-shaped edge 1323 is equal to the preset distance L. Similar to the second embodiment, when the projection of the extension portion 132 on the second direction Y and the projection of the second sub-pixel 12 on the second direction Y have overlapped portions, the portion of the fourth side edge 1322 of the extension portion 132 proximate to the body portion 131 (corresponding to the portion whose projection do not overlap with the projection of the second sub-pixel 12) is the arc-shaped edge 1323, and the remaining portion of the fourth side edge 1322 (corresponding to the portion whose projection overlaps with the projection of the second sub-pixel 12) is a straight line or oblique line, and the distance between the straight line or oblique line and the side edge of the second sub-pixel 12 proximate to the first sub-pixel 11 in the second direction Y is equal to the preset distance L. The distance between any point on the arc-shaped edge 1323 and the vertex A of the second sub-pixel 12 proximate to the extension portion 132 is equal to the preset distance L, thereby further enlarging the area of the extension portion 132 and ensuring that the spacing between the second sub-pixel 12 and the extension portion 132 is within the range of the preset distance L, further increasing the area utilization ratio of the pixel unit 10 and increasing the light-emitting area of the pixel unit 10. Alternatively, when the projection of the extension portion 132 on the second direction Y and the projection of the second sub-pixel 12 on the second direction Y have no overlapped portion, the fourth side edge 1322 of the extension portion 132 as a whole is an arc-shaped edge 1323, and the distance between the vertex A of the second sub-pixel 12 proximate to the extension portion 132 and any point on the arc-shaped edge 1323 is equal to the preset distance L. In this way, the region between the fourth side edge 1322 and the side edge of the body portion 131 proximate to the second sub-pixel 12 is effectively utilized, the area of the extension portion 132 is further enlarged, and the spacing between the second sub-pixel 12 and the extension portion 132 is ensured to be within the range of the preset distance L. The area utilization ratio of the pixel unit 10 is further increased, and the light-emitting area of the pixel unit 10 is enlarged.

Figure 7:
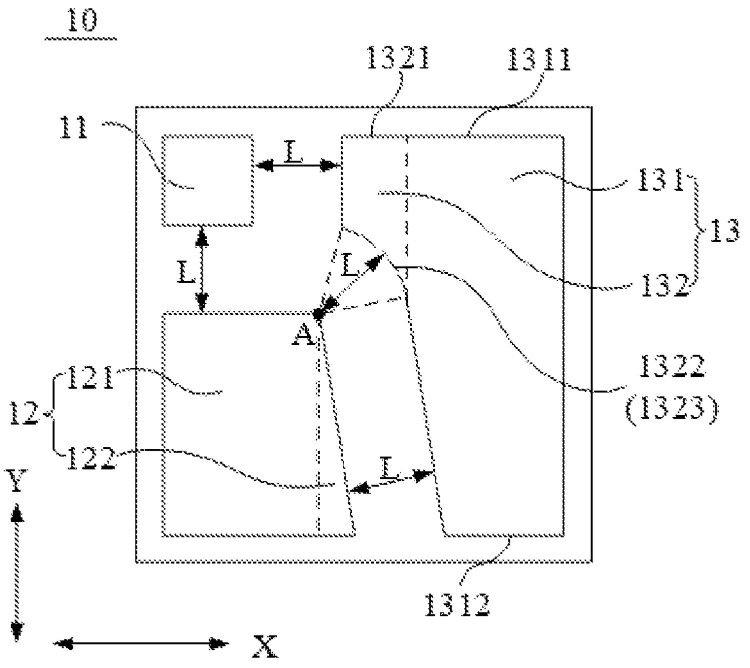
FIG. 7 is a schematic structural diagram of a pixel unit according to a sixth embodiment of the present disclosure.

As shown in FIG. 7, FIG. 7 is a schematic structural diagram of a pixel unit according to the sixth embodiment of the present disclosure. Similarly, unlike the fourth embodiment, in the present embodiment, the fourth side edge 1322 of the extension portion 132 includes an arc-shaped edge 1323, the arc-shaped edge 1323 is connected to a side edge of the body portion 131 proximate to the second sub-pixel 12, and a distance between the vertex A of the second sub-pixel 12 proximate to the extension portion 132 and any point on the arc-shaped edge 1323 is equal to a preset distance L. In this way, the region between the fourth side edge 1322 and the side edge of the body portion 131 proximate to the second sub-pixel 12 is effectively utilized, the area of the extension portion 132 is further enlarged, and the spacing between the second sub-pixel 12 and the extension portion 132 is ensured to be within the range of the preset distance L. The area utilization rate of the pixel unit 10 is further increased, and the light-emitting area of the pixel unit 10 is enlarged.

In the present embodiment, the area utilization ratio of the pixel unit 10 in the present embodiment is 42.16% through the calculation and analysis of experimental data. In comparison with the above-mentioned embodiment, the area utilization ratio of the pixel unit 10 in the present embodiment is further increased.

Figure 8:
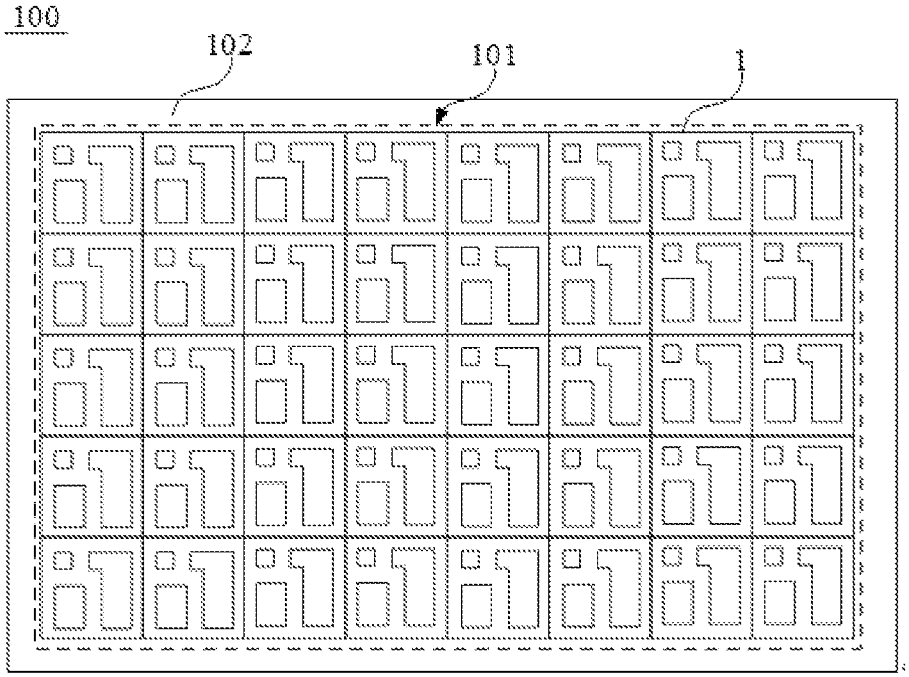
FIG. 8 is a schematic structural diagram of a display panel according to an embodiment of the present disclosure.

As shown in FIG. 8, FIG. 8 is a schematic structural diagram of a display panel according to an embodiment of the present disclosure. In the present embodiment, a display panel 100 is provided. The display panel 100 includes a display region 101 and a non-display region 102 located around the display region 101. The display region 101 is configured to display images and the non-display region 102 is configured to set other structures and components of the display panel 100.

Specifically, the display region 101 includes the pixel structure 1. The specific structure and function of the pixel structure 1 is the same or similar to the specific structure and function of the pixel structure 1 involved in the above-mentioned embodiments, and may achieve the same technical effects. For more details, the specific illustration above may be referred to, and will not be repeated here.

The display panel 100 provided in the present embodiment, with the resolution being constant, i.e., with the area of each pixel unit 10 of the pixel structure 1 being constant, by optimizing the shape, area and layout of the red sub-pixels, the green sub-pixels and the blue sub-pixels in each pixel unit 10, the luminous life-spans of the red sub-pixels, the green sub-pixels and the blue sub-pixels may be effectively balanced, such that the luminous life-spans of the red sub-pixels, the green sub-pixels and the blue sub-pixels tend to be the same, thus avoiding the problem of reddishly displayed image caused by the excessively rapid decay of the luminous brightness of the green sub-pixels or the blue sub-pixels at the later usage period of the display panel 100. Further, the area utilization ratio of the pixel unit 10 may be effectively increased, such that the area utilization ratio of the pixel unit 10 may be greater than 41.65%, thereby increasing the screen display brightness and further improving the screen display quality of the display panel 100.

The above are only implementations of the present disclosure, and do not limit the patent scope of the present disclosure. Any equivalent changes to the structure or processes made by the description and drawings of this application or directly or indirectly used in other related technical field are included in the protection scope of this application.

What is claimed is:

1. A pixel structure, comprising a plurality of pixel units, each of the plurality of pixel units comprising a first sub-pixel, a second sub-pixel and a third sub-pixel; wherein the first sub-pixel and the second sub-pixel are located on a same side of the third sub-pixel along a first direction; each of the first sub-pixel and the second sub-pixel is arranged opposite to the third sub-pixel, and the first sub-pixel and the second sub-pixel are arranged opposite to each other along a second direction; the first direction intersects with the second direction;

areas of the first sub-pixel, the second sub-pixel, and the third sub-pixel increase sequentially; the third sub-pixel comprises a body portion and an extension portion, the body portion extends in the second direction, the extension portion is connected to the body portion and extends in the first direction towards the first sub-pixel, and the extension portion is arranged opposite to the first sub-pixel; and an angle between a side edge of the second sub-pixel proximate to the body portion and a side edge of the second sub-pixel proximate to the first sub-pixel is a right-angle, an acute angle, or an obtuse angle; and the extension portion comprises a side edge extending in the first direction, when the angle between the side edge of the second sub-pixel proximate to the body portion and the side edge of the second sub-pixel proximate to the first sub-pixel is the right-angle, a perpendicular distance between the side edge of the body portion proximate to the second sub-pixel and the side edge of the second sub-pixel proximate to the body portion is greater than a length of the side edge of the extension portion.

2. The pixel structure as claimed in claim 1, wherein the body portion comprises a first side edge and a second side edge arranged opposite to each other along the second direction;

the extension portion comprises a third side edge and a fourth side edge arranged opposite to each other along the second direction;

a side edge of the first sub-pixel away from the second sub-pixel, the first side edge and the third side edge are flush in the first direction;

a side edge of the first sub-pixel away from the third sub-pixel is flush with a side edge of the second sub-pixel away from the third sub-pixel in the second direction; and a side edge of the second sub-pixel away from the first sub-pixel is flush with the second side edge in the first direction.

3. The pixel structure as claimed in claim 2, wherein a spacing between the first sub-pixel and the extension portion, a spacing between the first sub-pixel and the second sub-pixel and a spacing between the second sub-pixel and the body portion are equal and equal to a preset distance; and a distance between any point on the side edge of the second sub-pixel proximate to the first sub-pixel and any point on the fourth side edge is greater than or equal to the preset distance.

4. The pixel structure as claimed in claim 3, wherein each of the first sub-pixel, the second sub-pixel, the body portion and the extension portion is a rectangle; and a distance between the fourth side edge and the side edge of the second sub-pixel proximate to the first sub-pixel in the second direction is equal to the preset distance.

5. The pixel structure as claimed in claim 3, wherein each of the first sub-pixel, the second sub-pixel and the body portion is a rectangle; and the fourth side edge comprises an arc-shaped edge, the arc-shaped edge is connected to the side edge of the body portion proximate to the second sub-pixel, and the distance between a vertex of the second sub-pixel proximate to the extension portion and any point on the arc-shaped edge is equal to the preset distance.

6. The pixel structure as claimed in claim 3, wherein the first sub-pixel is a rectangle, the side edge of the body portion proximate to the second sub-pixel and the side edge of the second sub-pixel proximate to the body portion are parallel to each other, and the perpendicular distance between the side edge of the body portion proximate to the second sub-pixel and the side edge of the second sub-pixel proximate to the body portion is equal to the preset distance.

7. The pixel structure as claimed in claim 6, wherein an angle between the fourth side edge and a side edge of the extension portion proximate to the first sub-pixel is an obtuse angle, and a perpendicular distance between a vertex of the second sub-pixel proximate to the extension portion and the fourth side edge is equal to the preset distance.

8. The pixel structure as claimed in claim 7, wherein the second sub-pixel comprises a rectangular portion and a compensation portion, the compensation portion is provided on a side of the rectangular portion proximate to the body portion and is connected to the rectangular portion.

9. The pixel structure as claimed in claim 6, wherein the fourth side edge comprises an arc-shaped edge, the arc-shaped edge is connected to the side edge of the body portion proximate to the second sub-pixel, and a distance of the second sub-pixel proximate to the apex of the extension portion and any point on the arc-shaped edge is equal to the preset distance.

10. The pixel structure as claimed in claim 9, wherein the second sub-pixel comprises a rectangular portion and a compensation portion, the compensation portion is provided on a side of the rectangular portion proximate to the body portion and is connected to the rectangular portion.

11. The pixel structure as claimed claim 1, wherein the first sub-pixel is a red sub-pixel, the second sub-pixel is a green sub-pixel and the third sub-pixel is a blue sub-pixel; the preset distance ranges from 10 μm to 40 μm and the area utilization ratio of the pixel unit is greater than 41.65%.

12. A display panel, comprising a display region and a non-display region located around the display region; wherein the display region comprises a pixel structure, the pixel structure comprises a plurality of pixel units, each of the plurality of pixel units comprises a first sub-pixel, a second sub-pixel and a third sub-pixel;

wherein the first sub-pixel and the second sub-pixel are located on a same side of the third sub-pixel along a first direction; each of the first sub-pixel and the second sub-pixel is arranged opposite to the third sub-pixel, and the first sub-pixel and the second sub-pixel are arranged opposite to each other along a second direction; the first direction intersects with the second direction; and areas of the first sub-pixel, the second sub-pixel, and the third sub-pixel increase sequentially;

the third sub-pixel comprises a body portion and an extension portion, the body portion extends in the second direction, the extension portion is connected to the body portion and extends in the first direction towards the first sub-pixel, and the extension portion is arranged opposite to the first sub-pixel; and an angle between a side edge of the second sub-pixel proximate to the body portion and a side edge of the second sub-pixel proximate to the first sub-pixel is a right-angle, an acute angle, or an obtuse angle; and the extension portion comprises a side edge extending in the first direction, when the angle between the side edge of the second sub-pixel proximate to the body portion and the side edge of the second sub-pixel proximate to the first sub-pixel is the right-angle, a perpendicular distance between the side edge of the body portion proximate to the second sub-pixel and the side edge of the second sub-pixel proximate to the body portion is greater than a length of the side edge of the extension portion.

13. The display panel as claimed in claim 12, wherein the body portion comprises a first side edge and a second side edge arranged opposite to each other along the second direction;

the extension portion comprises a third side edge and a fourth side edge arranged opposite to each other along the second direction;

a side edge of the first sub-pixel away from the second sub-pixel, the first side edge and the third side edge are flush in the first direction;

a side edge of the first sub-pixel away from the third sub-pixel is flush with a side edge of the second sub-pixel away from the third sub-pixel in the second direction; and a side edge of the second sub-pixel away from the first sub-pixel is flush with the second side edge in the first direction.

14. The display panel as claimed in claim 13, wherein a spacing between the first sub-pixel and the extension portion, a spacing between the first sub-pixel and the second sub-pixel and a spacing between the second sub-pixel and the body portion are equal and equal to a preset distance; and a distance between any point on the side edge of the second sub-pixel proximate to the first sub-pixel and any point on the fourth side edge is greater than or equal to the preset distance.

15. The display panel as claimed in claim 14, wherein each of the first sub-pixel, the second sub-pixel, the body portion and the extension portion is a rectangle; and a distance between the fourth side edge and the side edge of the second sub-pixel proximate to the first sub-pixel in the second direction is equal to the preset distance.

16. The display panel as claimed in claim 14, wherein each of the first sub-pixel, the second sub-pixel and the body portion is a rectangle; and the fourth side edge comprises an arc-shaped edge, the arc-shaped edge is connected to the side edge of the body portion proximate to the second sub-pixel, and the distance between a vertex of the second sub-pixel proximate to the extension portion and any point on the arc-shaped edge is equal to the preset distance.

17. The display panel as claimed in claim 14, wherein the first sub-pixel is a rectangle, the side edge of the body portion proximate to the second sub-pixel and the side edge of the second sub-pixel proximate to the body portion are parallel to each other, and the perpendicular distance between the side edge of the body portion proximate to the second sub-pixel and the side edge of the second sub-pixel proximate to the body portion is equal to the preset distance.

18. The display panel as claimed in claim 17, wherein an angle between the fourth side edge and a side edge of the extension portion proximate to the first sub-pixel is an obtuse angle, and a perpendicular distance between a vertex of the second sub-pixel proximate to the extension portion and the fourth side edge is equal to the preset distance.

19. The display panel as claimed in claim 17, wherein the fourth side edge comprises an arc-shaped edge, the arc-shaped edge is connected to the side edge of the body portion proximate to the second sub-pixel, and a distance of the second sub-pixel proximate to the apex of the extension portion and any point on the arc-shaped edge is equal to the preset distance.

20. The display panel as claimed in claim 12, wherein the first sub-pixel is a red sub-pixel, the second sub-pixel is a green sub-pixel and the third sub-pixel is a blue sub-pixel; the preset distance ranges from 10 μm to 40 μm and the area utilization ratio of the pixel unit is greater than 41.65%.

* * * * *